May 29, 1956 A. DE VILDER 2,747,884
LEVELING ATTACHMENT FOR FARM IMPLEMENT HITCHES
Filed Dec. 2, 1954 3 Sheets-Sheet 1
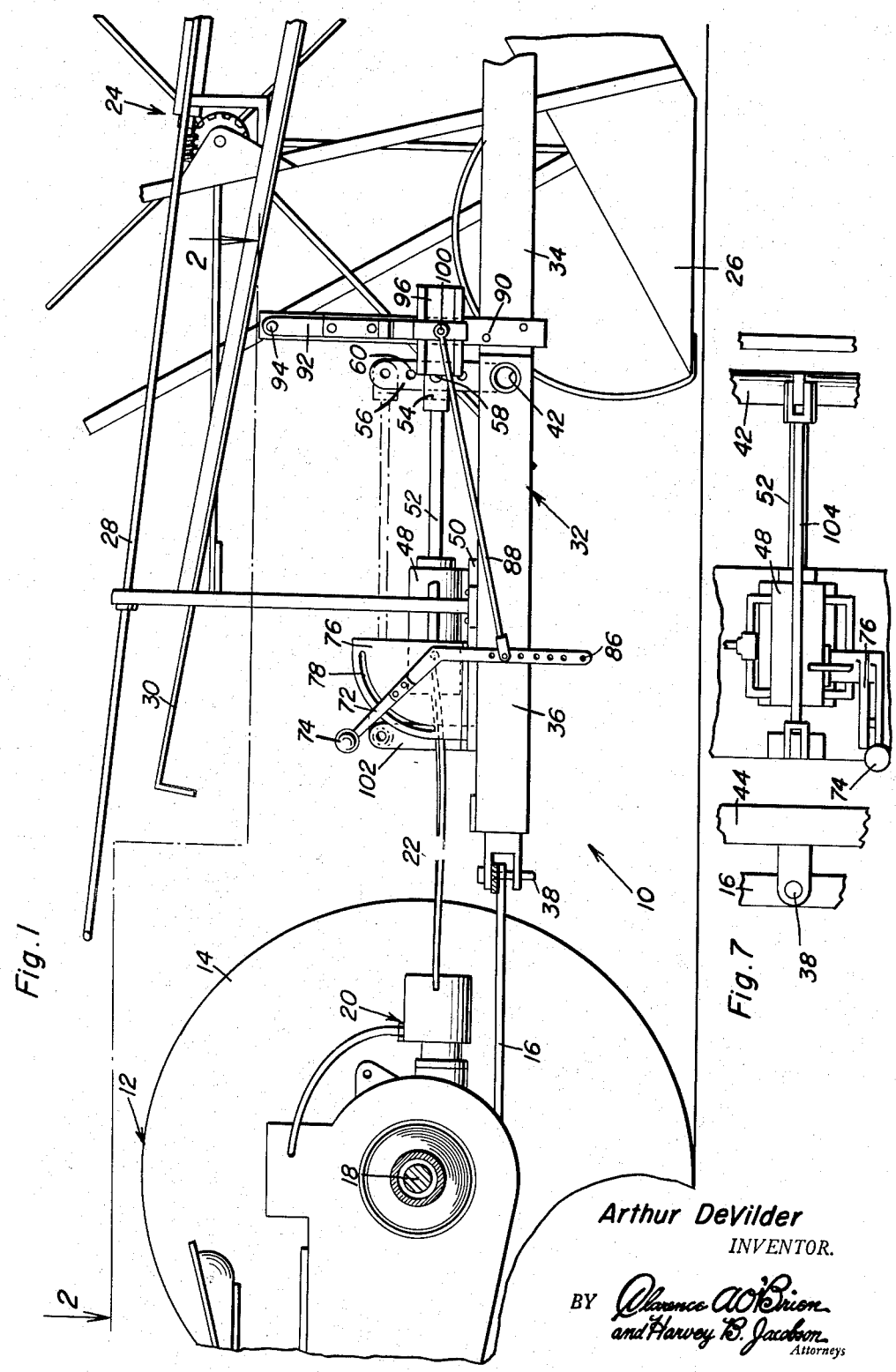
Arthur DeVilder
INVENTOR.

May 29, 1956    A. DE VILDER    2,747,884
LEVELING ATTACHMENT FOR FARM IMPLEMENT HITCHES
Filed Dec. 2, 1954    3 Sheets-Sheet 2
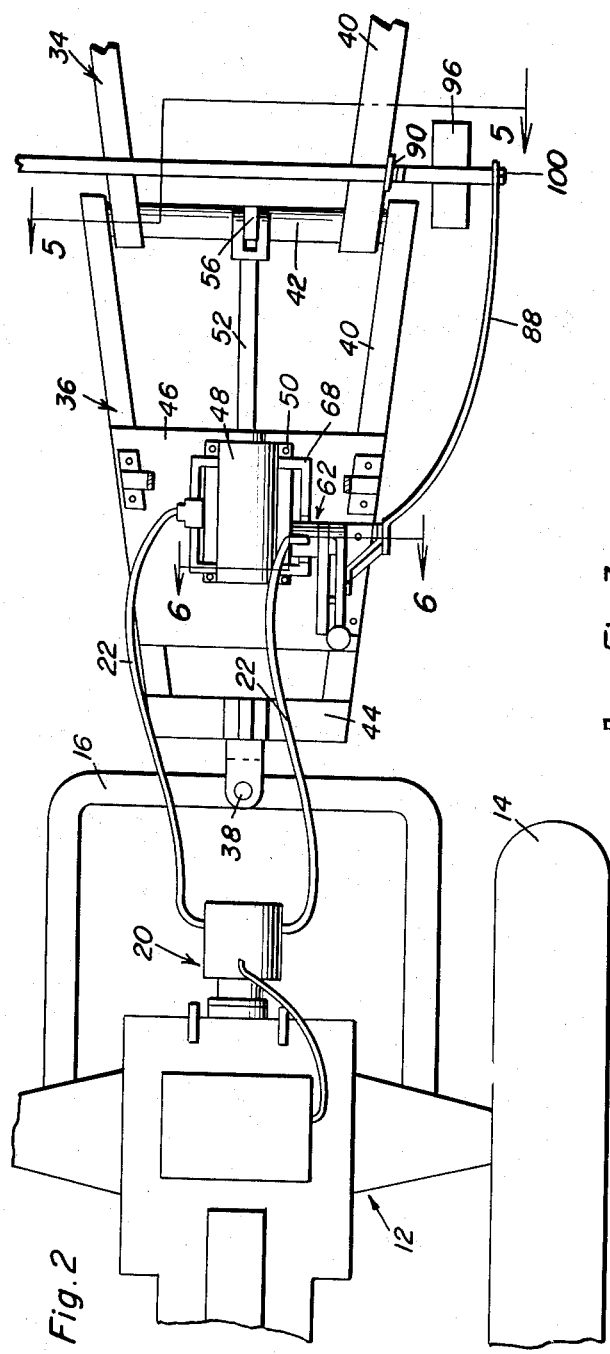
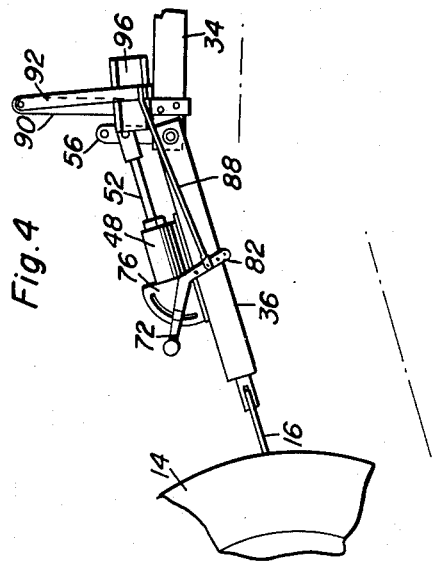
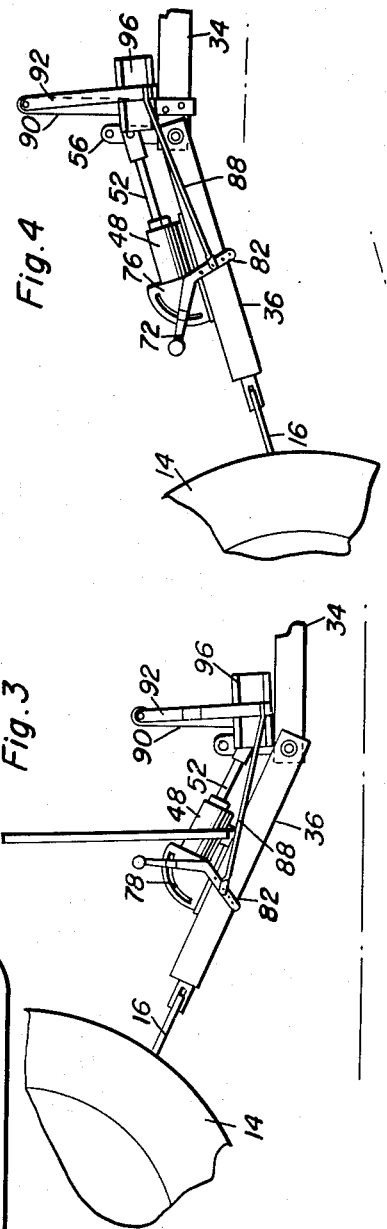
Arthur DeVilder
INVENTOR.

May 29, 1956     A. DE VILDER     2,747,884
LEVELING ATTACHMENT FOR FARM IMPLEMENT HITCHES
Filed Dec. 2, 1954     3 Sheets-Sheet 3

Arthur DeVilder
*INVENTOR.*

United States Patent Office 2,747,884
Patented May 29, 1956

2,747,884

LEVELING ATTACHMENT FOR FARM IMPLEMENT HITCHES

Arthur De Vilder, Brooklyn, Iowa

Application December 2, 1954, Serial No. 472,570

9 Claims. (Cl. 280—6)

This invention generally relates to hitches for farm implements, and more specifically provides a leveling attachment for tractor drawn farm implements having a hydraulic operating mechanism thereon, and is especially adapted for farm implements of the combine type or other harvesting implements.

In most tractor drawn farm machinery, it is necessary that the operator of the tractor drawn machinery, such as a combine, must steer and regulate the speed of the tractor as well as maintain a constant watch on the implement trailing behind in order to make certain that the cutting or harvesting operation is being satisfactorily performed. Consequently, this involves manipulation of a hand operated control lever which is usually provided for raising and lowering the cutting edge on the combine or other machinery to adjust for unevenness of the ground over which the implement is passing, thereby performing the harvesting operation in a most efficient manner so that all of the crop will be harvested. This requires substantially constant attention and continuous operation of the manually operated control lever which is usually in an awkward and fatigue inducing position. Accordingly, it is the primary object of the present invention to provide a new and improved leveling attachment especially adapted for tractor drawn combines which retains the combine in a level position for retaining the cutting element of the combine in a constant position so that a constant quantity of grain and straw will be deposited on the sieve of the combine regardless of the terrain being traversed thereby.

Another object of this invention is to provide a leveling attachment that is automatically operated and is responsive to the variations in the terrain and is actuated by a hydraulic pressure system.

Yet another object of this invention is to provide an automatic hydraulic operating leveling means for raising and lowering the cutting bar of a combine so that the combine will be retained in a level position for cutting the grain at the same height.

Still another object of the present invention is to provide a leveling attachment together with means for rigidly securing the combine in a desired position when the automatic leveling means is rendered inoperative.

Still another important object of the present invention is to provide a leveling attachment that is rugged in construction, easily applied to existing farm implements, facilitates the harvesting operation by the operators of the tractors or other vehicles, expeditiously performs the harvesting operation in an efficient and effective manner, that is well adapted for its intended purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing portions of a tractor and a combine together with the leveling attachment of the present invention;

Figure 2 is a top plan view of the construction of Figure 1;

Figure 3 is a fragmentary side elevational view showing the relative positions of the elements of the present invention when the tractor is going uphill;

Figure 4 is a fragmentary side elevational view similar to Figure 3 showing the position of the elements of the invention when the tractor is going downhill;

Figure 5:
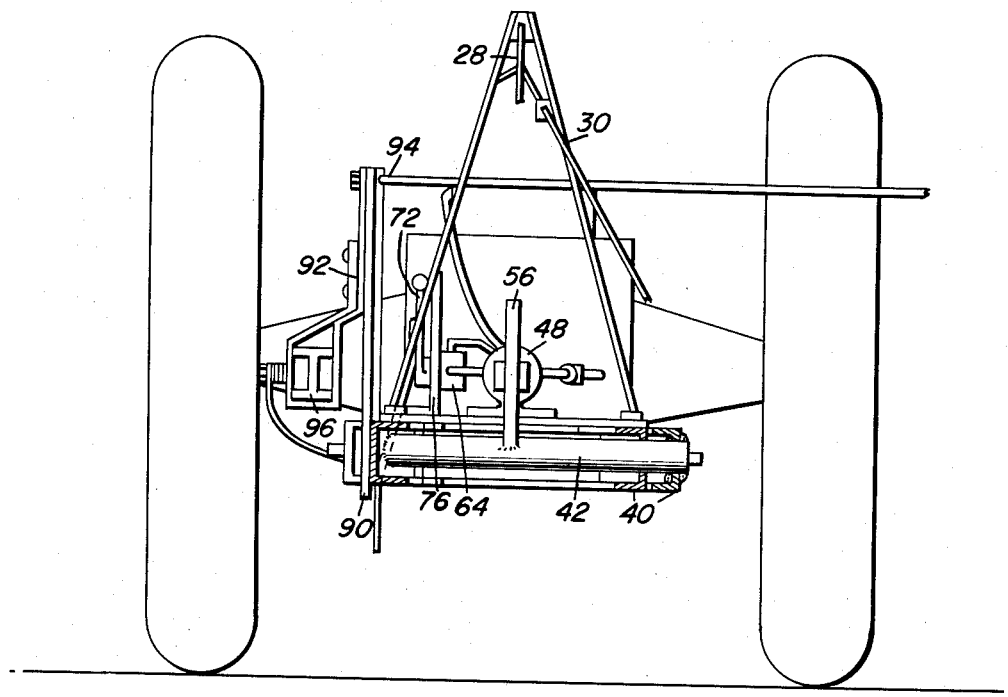
Figure 5 is a transverse, vertical sectional view taken substantially upon a plane passing along section line 5—5 of Figure 2 showing the details of construction of the second section of the tongue element and the transverse bar rigidly secured thereto for pivotally supporting the first section of the combine tongue.
Figure 6:
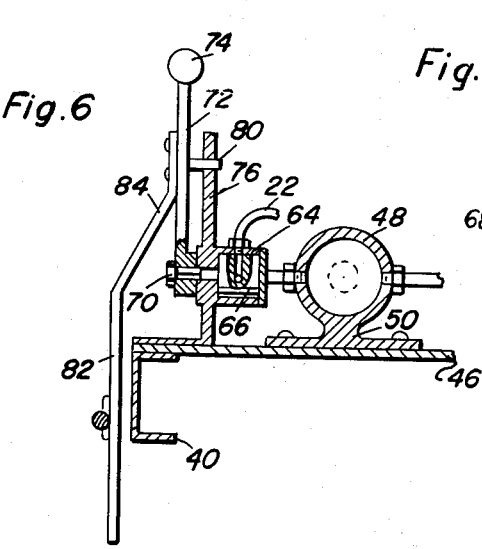
Figure 8:
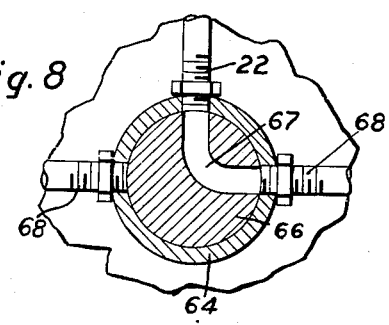

Figure 6 is a transverse, vertical sectional view taken substantially upon a plane passing along section line 6—6 of Figure 2 showing the details of construction of the control valve together with the control means for the hydraulic cylinder piston arrangement; and Figure 7 is a detail top plan view showing the locking bar in position for locking the sections of the tongue in longitudinally aligned position; and Figure 8 is a detailed sectional view illustrating the control valve.

Referring now specifically to the drawings, it will be seen that the numeral 10 generally designates the leveling attachment of the present invention wherein the attachment 10 is generally for use in conjunction with a tractor 12 having rear driving wheels 14 together with a drawbar 16, a rear axle 18 and a fluid pressure system generally designated by the numeral 20 and having flexible lines 22 connected thereto. The tractor 12 is illustrated for pulling a combine generally designated by the numeral 24 and including a horizontally disposed cutting element 26 together with various manual control rods 28 and 30 which are not specifically described here inasmuch as the attachment 20 of the present invention may be utilized with other types of farm implements. The combine 24 is generally provided with a rigid frame member projecting forwardly as a tongue 32 having a rigid second section 34 attached to the combine 24 and a first section 36 pivotally attached to the second section 34 at its rear end and attached to the drawbar 16 at its forward end by a pin 38 in the usual manner.

As illustrated in Figure 2, the first section 36 and the second section 34 each include rearwardly diverging side rails 40 wherein the forward ends of the rails 40 forming the second section 34 are rigidly secured together by a transverse rod 42 which projects through and beyond the slide rails 40. The forward ends of the rails 40 forming the first section 36 of the tongue 32 are connected together by a rigid plate 44. Secured to the upper surface of the side rails 40 substantially at the midpoint thereof on the first section 36 is an enlarged plate 46 having a hydraulic cylinder 48 mounted on a suitable bracket 50 on the upper surface thereof. The cylinder 48 is provided with a piston having an extending piston rod 52 projecting longitudinally therefrom and terminating in a U-shaped clevis 54 that is attached to an upstanding bracket 56 on the transverse rod 42 by pivot pins 58. It is noted that a plurality of apertures 60 are provided in the upstanding bracket 56 for adjusting the position of attachment of the clevis 54.

It will be seen that one of the lines 22 acts as an exhaust or return line from the cylinder 48 and the other of the lines 22 acts as a supply line for the cylinder 48 wherein the supply line 22 is connected through a control valve generally designated by the numeral 62 which controls the admission of pressurized fluid into the cylinder 48 for extending or retracting the piston rod 52. The control valve 62 generally includes a housing 64 having a valve plug 66 pivotally mounted therein and having an angulated passage 67 for selectively passing pressurized fluid from the supply line 22 into one of the conduits 68 which terminates at opposite ends of the cylinder 48 wherein rotation of the valve plug 66 will selectively supply pressurized fluid to the cylinder 48 at opposite ends thereof for selectively retracting or extending the piston rod 52. In order to rotate the valve plug 66, a longitudinally extending shaft 70 is provided thereon wherein a handle 72 is secured thereto and the handle 72 is provided with a knob 74 on the free end thereof wherein by manual control of the handle 72, the valve plug 66 may be pivoted or rotated thereby extending or retracting the piston rod 52 for pivoting the first section 36 in relation to the second section 34 of the tongue 32. It is noted that the transverse rod 42 extends outwardly and journals the ends of the side rails 40 forming the first section 36 of the tongue 32. Also, the housing 64 of the valve 62 includes an arcuate plate 76 having an arcuate slot 78 therein for receiving a pin 80 which projects from the handle 72, thereby limiting the pivotal movement of the valve plug 66 wherein the two extreme positions of the handle 72 will be determined for controlling the actuation of the piston rod 52.

Secured to the handle 72 is a depending arm 82 having an offset portion 84 at the upper end for attachment to the handle 72 wherein the arm 82 will depend vertically from the shaft 70 of the valve plug 66. The arm 82 is provided with a series of spaced apertures 86 for attachment of a connecting link 88 in adjusted relation. Adjacent the forward end of the second section 34 is an elongated upstanding bracket 90 having an elongated swingable member 92 pivoted thereto by a pivot pin 94 at the upper end thereof and an enlarged weight 96 is suspended by the swingable member 92 in freely swinging relation so that the swingable member 92 will always be disposed in a vertical position. The connecting link 88 is attached to the swingable member 92 adjacent the bottom thereof by a pivot pin 100 thereby transmitting any movement of the swinging member 92 to the arm 82 thereby rotating the valve plug 66 upon relative movement between the swinging member 92 and the first section 36 of the tongue 32.

Referring now specifically to Figures 1 and 7, it will be seen that the plate 46 is provided with an upstanding bracket 102 at its forward end and an elongated rigid member 104 interconnects the upper end of the bracket 102 with the upper end of the bracket 56 on the transverse rod 42 wherein the first section 36 and the second section 34 of the tongue 32 will be locked in longitudinal alignment and the hydraulic cylinder 48 will be rendered inoperative for operation on level ground or for transportation of the combine 24 to a new location wherein it is not important to retain the cutting element of the combine 24 in level position.

In practical operation, the combine 24 is hitched to the drawbar 16 of the tractor 12 in the usual manner, and by presetting the second section 34 of the tongue 32 in the desired elevated position, the hydraulic cylinder 48 is so related to the swinging weight 96 that the second section 34 will be constantly retained in the desired position by actuation of the control valve plug 66 by the link 88. As illustrated in Figure 3, the tractor 12 is proceeding up a hill wherein the front section 36 of the tongue 32 is pivoted to an inclined position and normally would so incline the second section 34 of the tongue 32. However, in order to retain the second section 34 in level condition, thereby assuring that the cutter 26 will evenly cut the crop of grain, the pendulum weight 96 is urged rearwardly by gravity thereby pulling the link 88 rearwardly which will cause the valve plug 66 to rotate, thereby admitting pressure to the correct side of the piston in the cylinder 48 for retracting the piston rod 52 thereby retaining the first section 36 in angular relation to the second section 34 of the tongue 32, thereby retaining the section 34 of the tongue 32 in horizontally level position, thereby retaining the entire combine 24 in a level position.

As illustrated in Figure 4, the tractor 12 is descending a hill, and the drawbar 16 together with the first section 36 would normally draw the second section 34 of the tongue 32 downwardly in a downwardly inclined position. In order to retain the second section 34 in horizontally level condition, the pendulum weight 96 again urges on the link 88 thereby rotating the valve plug 66 for admitting pressurized fluid into the other end of the cylinder 48 thereby extending the piston rod 52 for positioning the first section 36 in angular relation to the second section 34 thereby retaining the section 34 in horizontally level position. It will be seen that the pendulum weight 96 is normally and continuously urged to a normal position with the swinging member 92 in vertical position due to the action of gravity. As this weight 96 is normally retained in a vertical position, any tendency to move the second section 34 away from a normally horizontal position will be reflected by movement of the connecting link 88 thereby moving the control valve plug 66 so that the angular position of the first section 36 and the second section 34 will be retained, thereby retaining the second section 34 in horizontally level position. With the second section 34 in level position, the combine 24 will be operated at all times at an equal distance from the ground surface, regardless of the terrain, and it will be noted that the fluid pressure operating means is directly responsive to changes in the terrain traversed, thereby forming a leveling attachment that is responsive to changes in the terrain being traversed. The locking bar 104 is utilized when it is desired to retain the first section 36 and the second section 34 of the tongue 32 in rigid relationship, and it will be understood that various formations of the locking bar 104 may be provided together with suitable brackets upstanding from the first and second sections 36 and 34.

While the device has been illustrated as being practical on a combine, it will be understood that the device may be utilized on any type of farm implement having a cutting head, pick-up members or the like wherein it is desirable to retain the operating mechanism at a predetermined desired distance from the ground surface and also to retain the device in substantially a level position. Further, it will be seen that the device eliminates the necessity for constant adjustment by the operator of the tractor, thereby leaving him free to perform other duties as may become necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position.

2. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, said connecting link being adjustably attached to said arm for adjusting the normal angular relation between the first and second sections for normally disposing the second section in horizontally level condition.

3. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, and a handle connected to said arm for manually actuating the piston and cylinder for manually raising and lowering said second section.

4. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, and rigid means selectively interconnecting said first and second sections for locking said first and second sections in rigid longitudinally aligned position.

5. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, said pendulum including a weight attached to an elongated vertically disposed swinging member, said swinging member being pivotally attached at its upper end to an elongated vertically disposed support bar.

6. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, said cylinder being rigidly attached to said first section, said piston including a longitudinally extending piston rod pivotally attached to the upstanding bracket on the second section in vertically spaced relation to the pivotal connection between said sections.

7. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, said connecting link being adjustably attached to said arm for adjusting the normal angular relation between the first and second sections for normally disposing the second section in horizontally level condition, and a handle connected to said arm for manually actuating the piston and cylinder for manually raising and lowering said second section.

8. A leveling attachment for vehicles having a fluid pressure system and a drawbar for pulling implements equipped with a tongue, said attachment comprising an articulated tongue having a first section adapted to be attached to a vehicle drawbar and a second section attached to the implement, said sections being pivotally secured together, and means interconnecting the first and second sections for adjusting the angular relation between said sections for retaining the second section level, said means being responsive to variations in the ground surface traversed by the vehicle and implement, said means being actuated by the fluid pressure system on the vehicle, said means including an upstanding bracket mounted on each of said sections, an extensible and retractable piston and cylinder interconnecting said brackets, means for supplying and exhausting pressurized fluid from the piston and cylinder, and control means for controlling the movement of the piston and cylinder, said control means including a control valve, a lateral arm extending from said control valve, a pendulum swingably mounted on said second section, a link interconnecting said pendulum and arm for actuating said control valve when the second section is moved to an inclined position thereby actuating the piston and cylinder for returning the second section to a horizontally level position, said connecting link being adjustably attached to said arm for adjusting the normal angular relation between the first and second sections for normally disposing the second section in horizontally level condition, and a handle connected to said arm for manually actuating the piston and cylinder for manually raising and lowering said second section, and rigid means selectively interconnecting said first and second sections for locking said first and second sections in rigid longitudinally aligned position.

9. The structure defined in claim 8 wherein said cylinder is rigidly attached to said first section, said piston including a longitudinally extending piston rod pivotally attached to the upstandng bracket on the second section in vertically spaced relation to the pivotal connection between said sections.

References Cited in the file of this patent
UNITED STATES PATENTS

| 2,504,289 | Waterman | Apr. 18, 1950 |
| 2,520,266 | Adams | Aug. 29, 1950 |
| 2,572,910 | Brown | Oct. 30, 1951 |